US008737610B1

(12) United States Patent
Carlson et al.

(10) Patent No.: US 8,737,610 B1
(45) Date of Patent: May 27, 2014

(54) RESTRICTED IN SITU PREVIEWS FOR ELECTRONIC ADVERTISING

(75) Inventors: Adam Carlson, Seattle, WA (US); Nicole A. Deflaux, Seattle, WA (US); Joseph C. Lee, Seattle, WA (US); Brian A. Ecker, Crownsville, MD (US)

(73) Assignee: IMDB.com, Inc., Seattle, WA (US)

( * ) Notice: Subject to any disclaimer, the term of this patent is extended or adjusted under 35 U.S.C. 154(b) by 740 days.

(21) Appl. No.: 12/575,386

(22) Filed: Oct. 7, 2009

(51) Int. Cl.
*H04L 29/06* (2006.01)

(52) U.S. Cl.
USPC ........... 380/201; 713/159; 713/160; 713/170; 726/7; 726/19

(58) Field of Classification Search
USPC .................................. 380/211, 201
See application file for complete search history.

(56) References Cited

U.S. PATENT DOCUMENTS

| 2002/0170053 | A1* | 11/2002 | Peterka et al. ................. 725/31 |
| 2005/0216343 | A1* | 9/2005 | Tokorotani ...................... 705/14 |
| 2006/0166742 | A1* | 7/2006 | Willis et al. ..................... 463/42 |
| 2008/0097915 | A1* | 4/2008 | Golan et al. .................... 705/51 |
| 2008/0215879 | A1* | 9/2008 | Williams et al. .............. 713/159 |
| 2008/0235722 | A1* | 9/2008 | Baugher et al. ................. 725/32 |
| 2009/0113532 | A1* | 4/2009 | Lapidous ........................ 726/7 |
| 2009/0172752 | A1* | 7/2009 | Lopatic ........................... 725/87 |
| 2009/0217319 | A1* | 8/2009 | Weiss .............................. 725/34 |

OTHER PUBLICATIONS

Bhargavan, K., Fournet, C., Gordon, A. D., & O'Shea, G. (Nov. 11, 2005). An Advisor for Web Services Security Policies. ACM, 1-9.*

* cited by examiner

*Primary Examiner* — Mohammad L Rahman
(74) *Attorney, Agent, or Firm* — Novak Druce Connolly Bove + Quigg LLP (57) ABSTRACT

Supplemental content such as electronic advertisements may be previewed in situ. That is, supplemental content may be previewed in a context of a live and/or production environment along with the primary content available in that environment. In particular, electronic advertising that is still under development, that still requires testing and/or quality control, and/or electronic advertising that is unpublished may be incorporated into electronic pages by live and/or production electronic page generation computer systems. Furthermore, electronic advertising may be previewed in situ in a controlled and/or restricted manner.

30 Claims, 8 Drawing Sheets

RESTRICTED IN SITU PREVIEWS FOR ELECTRONIC ADVERTISING

BACKGROUND

Electronic pages, such as hypertext documents accessible via public computer networks, have become targets of popular viewing for reasons ranging from information to entertainment. For example, some electronic pages are viewed millions of times per day by a similar number of viewers. Moreover, it has become common for such pages to be dynamically generated in response to viewing requests, for example, to ensure that the page contains the latest content and/or to customize the page to the viewer. In fact, it is not uncommon for large and complex computer systems to be principally dedicated to the dynamic generation of electronic pages.

For reasons including the increasing volume of page views, the ability to customize and target advertisements, and the ability to obtain detailed advertisement response data, advertisers have become increasingly attracted to advertising on electronic pages. Incorporation of appropriate advertisements from multiple advertisers, in co-ordination with various advertising budgets, has itself become a sophisticated and complex part of electronic page generation. Indeed, it is not uncommon for large and complex computer systems to be principally dedicated just to advertising-related aspects of electronic page generation, and for electronic page owners to outsource those advertising-related aspects to organizations that maintain such systems. Furthermore, the electronic advertisements have themselves become sophisticated and complex. For example, advertisements may adapt themselves to a viewer, interact with a viewer, and/or interact with other advertisements.

While providing benefits to advertisers and viewers, all this sophistication and complexity can cause problems. For example, there is often a need to preview and/or test advertisement appearance and behavior in various viewing contexts to ensure that the advertisement contributes to viewer experience as intended. The sophistication and/or complexities of the electronic page generation systems can make a duplicate preview and/or test environment impractical, but it is undesirable to expose members of the general public to advertisements that are still under development. Conventional heavyweight authentication schemes can be cumbersome for controlling advertisement previews. On the other hand, some lightweight schemes fail to provide for sufficient control over previews.

BRIEF DESCRIPTION OF THE DRAWINGS

Various embodiments in accordance with the present disclosure will be described with reference to the drawings, in which.

Same numbers are used throughout the disclosure and figures to reference like components and features.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Electronic content, for example, content of electronic pages, may be classified into content categories including primary content and supplemental content. For example, supplemental content may include electronic advertising. In at least one embodiment, supplemental content may be previewed in situ. That is, supplemental content may be previewed in a context of a live and/or production environment along with the primary content available in that environment. In particular, electronic advertising that is still under development, that still requires testing and/or quality control, and/or electronic advertising that is unpublished may be incorporated into electronic pages by live and/or production electronic page generation computer systems. Furthermore, electronic advertising may be previewed in situ in a controlled and/or restricted manner. For example, previews may be restricted to a particular set of viewers, previews may be restricted to a particular set of electronic pages, previews may be limited in time, and/or a number of previews may be limited.

In at least one embodiment, preview restrictions may be enforced utilizing restricted preview tokens. Such tokens may include any suitable electronic indicia, and may reference any suitable supplemental content to be previewed in a controlled and/or restricted manner.

Restricted preview tokens may be generated, for example, by electronic advertisement developers, and distributed, for example, to advertisers, potential advertisers and/or focus groups. Requests to view electronic pages may include restricted preview tokens (or portions thereof). The restricted preview tokens (or portions thereof) may be validated. For example, it may be verified that a particular restricted preview token is a valid restricted preview token and is associated with supplemental content that is available for preview (i.e., is preview class supplemental content or "preview supplemental content"), that the restricted preview token is associated with a particular electronic page to be viewed, that the restricted preview token has not expired and/or that the associated preview supplemental content has not been viewed too many times. Throughout what follows, electronic advertising, electronic advertisements and/or electronic advertising campaigns are used as particular examples of electronic supplemental content ("supplemental content"). However, as will be appreciated by one of skill in the art, each embodiment is not limited to these particular examples.

Figure 1:
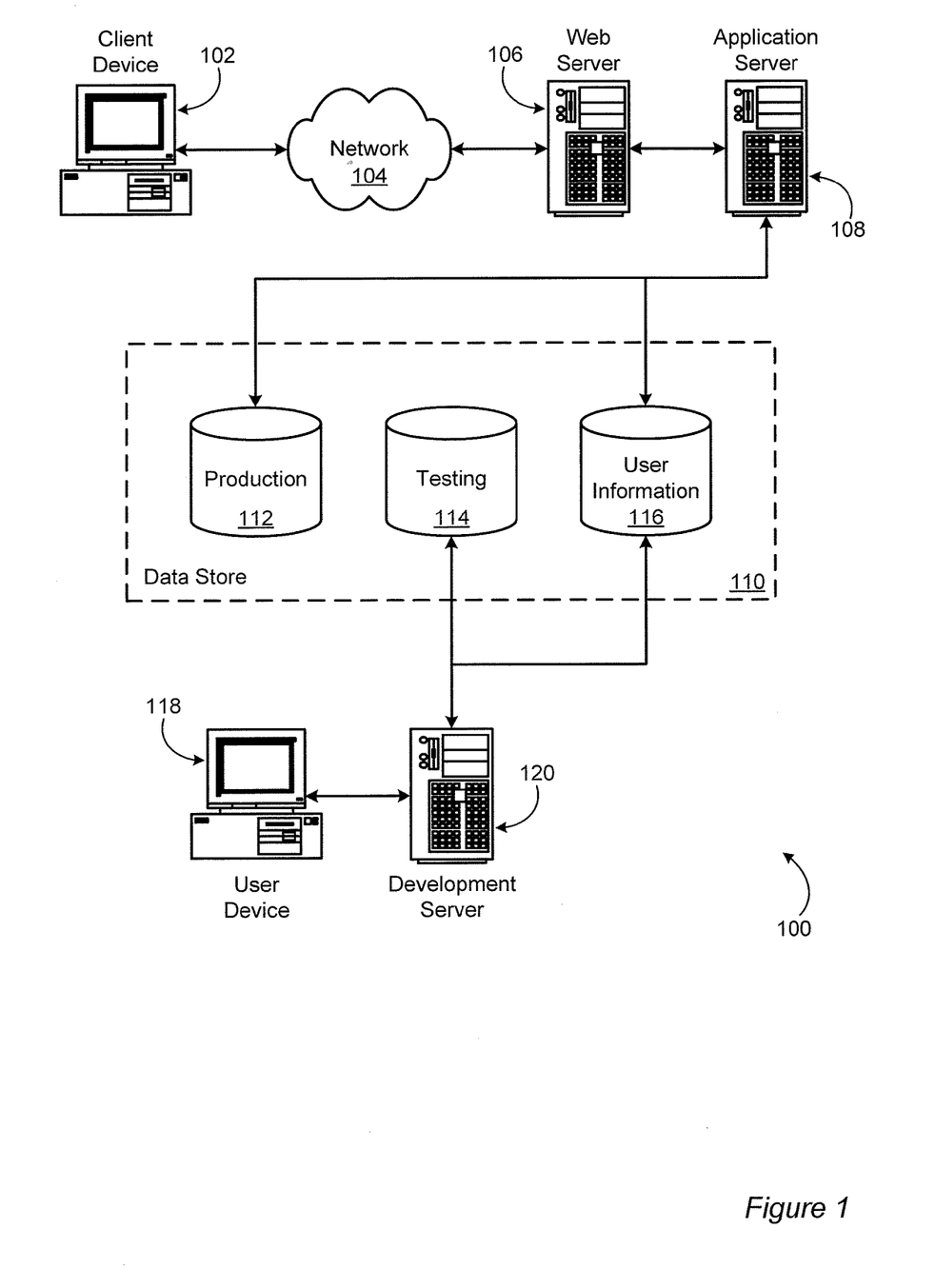
FIG. 1 is a schematic diagram illustrating an example environment for implementing aspects in accordance with at least one embodiment.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like. The network 104 may include any appropriate network, including an intranet, the Internet, a cellular network, a local area network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and is accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perforin its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
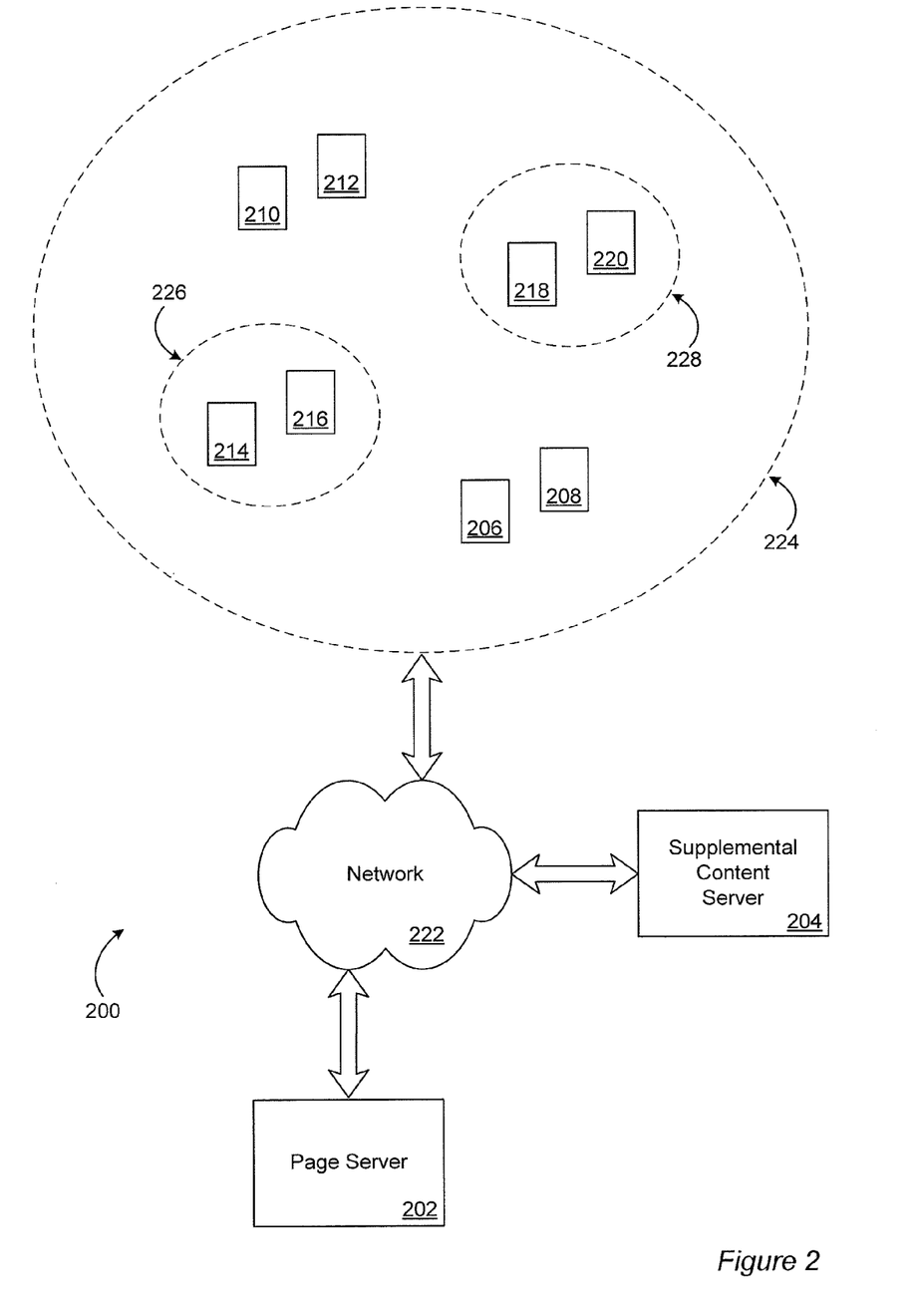
FIG. 2 is a schematic diagram depicting aspects of an example network environment suitable for incorporating at least one embodiment.

Before describing various embodiments in detail, it will be helpful to describe further details of network environments suitable for incorporating such embodiments. FIG. 2 depicts an example network environment 200 suitable for incorporating at least one embodiment. The network environment 200 includes an electronic page server 202, an electronic supplemental content server 204 such as an electronic advertisement server, and a plurality of electronic page viewing clients 206, 208, 210, 212, 214, 216, 218, 220 communicatively connected by a network 222.

The plurality of electronic page viewing clients 206, 208, 210, 212, 214, 216, 218, 220 are enclosed in a dashed line to indicate that they reside in a public portion 224 of the network environment 200. The public portion 224 of the network environment 200 may be accessible by members of the general public, for example, accessible anonymously or with some degree of anonymity. For example, the public portion 224 of the network environment 200 may participate in the Internet. The network 222 may participate in the Internet. The electronic page server 202 may have a public network interface. The public portion 224 of the network environment 200 may access the electronic page server 202 through the public network interface of the electronic page server 202. For example, each of the electronic page viewing clients 206, 208, 210, 212, 214, 216, 218, 220 may incorporate a hypertext transfer protocol (HTTP) client, and the electronic page server 202 may incorporate a hypertext transfer protocol (HTTP) server.

In at least one embodiment, restricted preview subsets 226, 228 of the public portion 224 of the network environment 200 may be defined. In the example depicted in FIG. 2, a first restricted preview set 226 includes electronic page viewing client 214 and electronic page viewing client 216, and a second restricted preview set 228 includes electronic page viewing client 218 and electronic page viewing client 220. Of course, restricted preview sets such as the restricted preview sets 226, 228 may include any suitable number of electronic page viewing clients. In at least one embodiment, electronic page viewing clients 214, 216, 218, 220 in restricted preview sets 226, 228 may be distinguished from electronic page viewing clients 206, 208, 210, 212 not in restricted preview sets 226, 228 by having reference to one or more restricted preview tokens. For example, electronic page viewing clients 214, 216 may reference a first restricted preview token, and electronic page viewing clients 218, 220 may reference a second restricted preview token. Restricted preview tokens in accordance with at least one embodiment are described in more detail below.

For example, electronic pages viewed by electronic page viewing clients 206, 208, 210, 212, 214, 216, 218, 220 may include hypertext markup language (HTML). However, electronic pages in accordance with at least one embodiment may include any suitable electronic page and/or document specification and/or markup language including extensible markup languages (XML), portable document format (PDF), and rich text format (RTF). Electronic pages in accordance with at least one embodiment may also be Web pages. Accordingly, the electronic page server 202 may incorporate a Web server. The electronic supplemental content server 204 may also incorporate a Web server. The electronic supplemental content server 204 is an example of a computer system that may be maintained by a supplemental content service such as an advertising service.

Referring back to FIG. 1, the electronic client device 102 may include, host and/or implement electronic page viewing clients such as the electronic page viewing clients 206, 208, 210, 212, 214, 216, 218, 220 of FIG. 2. The network 104 may include, or be included by, the network 222 of FIG. 2. The electronic page server 202 may include, and/or be implemented with, components corresponding to one or more of the Web server 106, the application server 108 and the data store 110. Similarly, the electronic supplemental content server 204 may include, and/or be implemented with, components corresponding to one or more of the Web server 106, the application server 108 and the data store 110.

Figure 3:
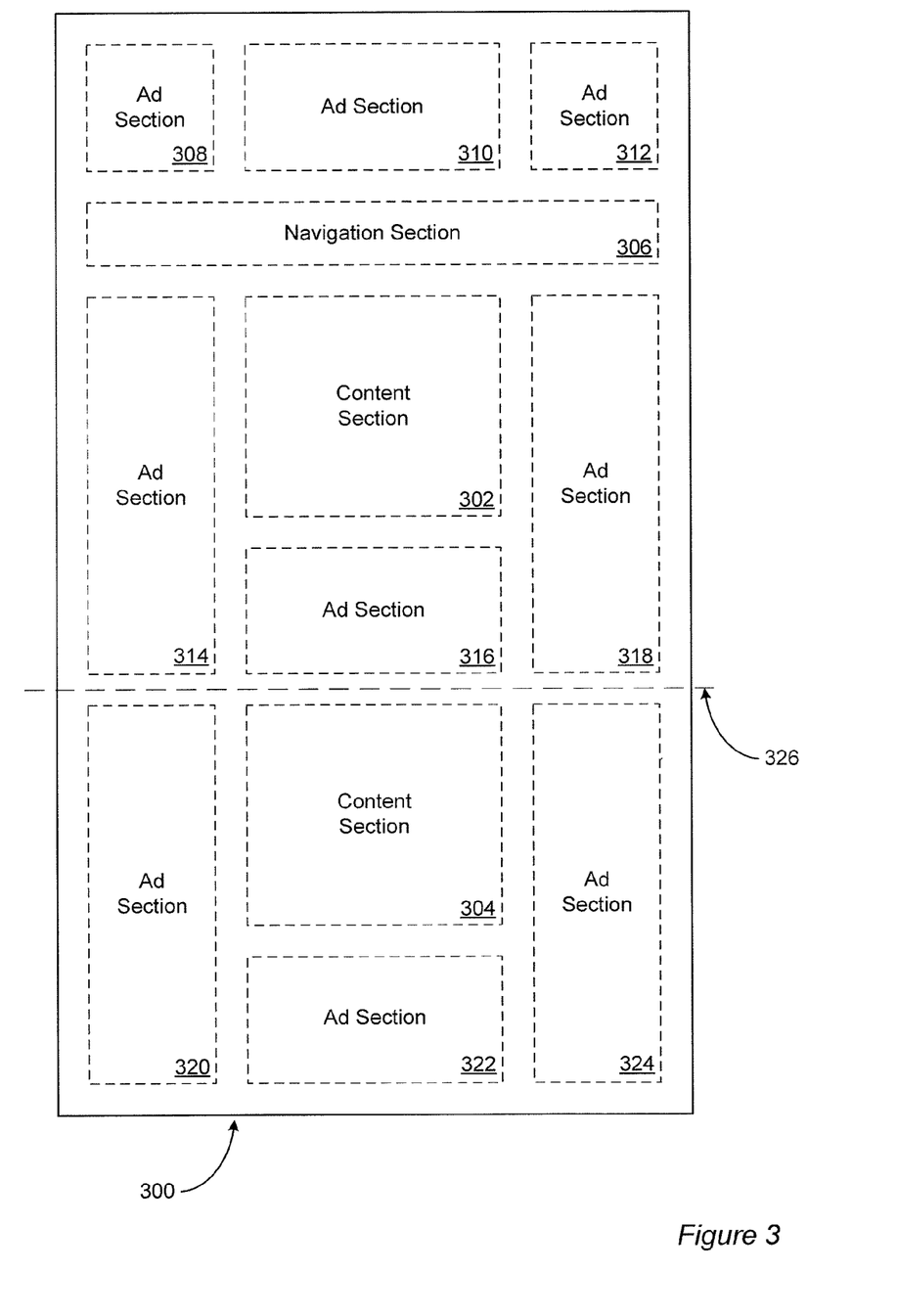
FIG. 3 is a schematic diagram depicting aspects of an example electronic page in accordance with at least one embodiment.

It will be helpful to describe how the electronic page server 202 and the electronic supplemental content server 204 interact in accordance with at least one embodiment to generate electronic pages suitable for viewing, for example, by the electronic page viewing clients 206, 208, 210, 212, 214, 216, 218, 220 of FIG. 2. FIG. 3 depicts an example electronic page 300 in accordance with at least one embodiment. The electronic page 300 may include multiple page sections. For example, the electronic page 300 may include one or more content sections 302, 304, a navigation section 306, and one or more advertising sections 308, 310, 312, 314, 316, 318, 320, 322, 324. The advertising sections 308, 310, 312, 314, 316, 318, 320, 322, 324 are examples of supplemental content sections. FIG. 3 depicts a particular number of page sections 302, 304, 308, 310, 312, 314, 316, 318, 320, 322, 324, but, of course, the electronic page 300 may include any suitable number of page sections and, moreover, any suitable number of page sections of each type, for example, the electronic page may include a plurality of navigation sections such as the navigation section 306. FIG. 3 further depicts the page sections 302, 304, 308, 310, 312, 314, 316, 318, 320, 322, 324 as arranged in a particular configuration, but, of course, the page sections 302, 304, 308, 310, 312, 314, 316, 318, 320, 322, 324 may be arranged in any suitable configuration.

The electronic page 300 may be rendered visible, for example, by one of the electronic page viewing clients 206, 208, 210, 212, 214, 216, 218, 220 of FIG. 2. Each electronic page viewing client 206, 208, 210, 212, 214, 216, 218, 220 may render the electronic page differently, for example, to accommodate differences in electronic page viewing hardware, electronic page software, and/or viewer preference. The electronic page 300 may be rendered as multiple screens of information. For example, the electronic page viewing client 206 may render a first portion of the electronic page 300 above the dashed line 326 as a first screen of information, and a second portion of the electronic page 300 below the dashed line 326 as a second screen of information. A viewer may interact with the electronic page viewing client 206 to move, switch and/or scroll between rendered screens.

The electronic page server 202 of FIG. 2 may generate the electronic page 300. In particular, the electronic page server 202 may generate each page section 302, 304, 308, 310, 312, 314, 316, 318, 320, 322, 324 of the electronic page 300. Content sections 302, 304 of the electronic page 300 may include content that attracts viewers to view the electronic page 300. Electronic pages such as the electronic page 300 may be members of a structured collection of electronic pages (e.g., be Web pages at a Web site). Navigation sections such as the navigation section 306 of the electronic page 300 may enable viewers of the electronic page 300 to navigate through the collection. Advertising sections 308, 310, 312, 314, 316, 318, 320, 322, 324 of the electronic page 300 may include electronic advertisements.

Since matching advertisements to viewers of electronic pages within advertising budget constraints may be complex, management of the advertising sections 308, 310, 312, 314, 316, 318, 320, 322, 324 of the electronic page 300 may be delegated, for example, to the electronic supplemental content server 204 of FIG. 2. As will be apparent to one of skill in the art, such delegation may be accomplished utilizing features of suitable electronic page specification languages such as hypertext markup language (HTML). Continuing the hypertext markup language example, each advertising section 308, 310, 312, 314, 316, 318, 320, 322, 324 of the electronic page 300 may be specified by utilizing a hypertext markup language inline frame tag such as the "iframe" tag described in the World Wide Web Consortium (W3C) Recommendation titled "HTML 4.01 Specification," edited by Raggett et al., published Dec. 24, 1999. The inline frame tag may reference the electronic supplemental content server 204.

The electronic supplemental content server 204 (FIG. 2) may maintain a data store (such as the data store 110 of FIG. 1), for example, of supplemental content providers such as advertisers, supplemental content such as advertisements, supplemental content programs such as advertising campaigns, and associated data. Supplemental content programs may target supplemental content to viewers based at least in part on a viewer classification. For example, viewers may be classified according to targeting information including associated geographic data such as region, associated demographic data such as age, gender, education, income, occupation and languages spoken, associated psychographic data such as personality classification, and associated behavioral data such as observed behavior. Supplemental content programs may further target supplemental content to viewers based at least in part on a page classification of an electronic page into which the supplemental content is to be incorporated. For example, electronic pages may be classified according to content and/or any suitable content classification taxonomy.

The electronic supplemental content server 204 (FIG. 2) may require that a delegated supplemental content section (e.g., the advertising section 314) conform to an electronic supplemental content server interface specification such as an electronic advertisement server interface specification. Continuing the hypertext markup language example, the electronic supplemental content server interface specification may specify that the delegated supplemental content section include an inline frame tag that references the electronic supplemental content server 204, for example, utilizing a uniform resource locator (URL). Moreover, the electronic supplemental content server interface specification may specify that the delegated supplemental content section provide the electronic supplemental content server 204 with a specified set of information such as a specified set of name-value pairs. Continuing the hypertext markup language example, the electronic supplemental content server interface specification may specify that the delegated supplemental content section include a uniform resource locator with the specified set of name-value pairs in a query string portion of the uniform resource locator.

The specified set of information to be provided to the electronic supplemental content server 204 (FIG. 2) may include one or more supplemental content program identifiers such as advertising campaign identifiers, as well as targeting information that facilitates viewer classification. For example, the delegated supplemental content section may include a set of name-value pairs that reference one or more advertising campaigns, as well as a set of name-value pairs that specify available geographic, demographic, psychographic and/or behavioral data associated with a viewer and/or electronic page viewing client 206, 208, 210, 212, 214, 216, 218, 220 requesting the electronic page 300.

In response to a request for the electronic page 300 from electronic page viewing clients 206, 208, 210, 212 (FIG. 2) in the public portion 224 of the network environment 200, the electronic page server 202 may provide a default and/or public version of the page 300. In at least one embodiment, in response to a request for the electronic page 300 from electronic page viewing clients 214, 216, 218, 220 in one of the restricted preview sets 226, 228, the electronic page server 202 may provide a restricted preview version and/or view of the page 300. In at least one embodiment, the restricted preview version of the page 300 differs from the public version of the page 300 in the electronic page specification language code ("electronic page specification code") utilized to specify one or more of the advertising sections 308, 310, 312, 314, 316, 318, 320, 322, 324. In at least one embodiment, the restricted preview version of the page 300 differs from the public version of the page 300, but remains in accordance with a same electronic supplemental content server interface specification. In at least one embodiment, the restricted preview version of the page 300 differs from the public version of the page 300 in the set of information provided to the electronic supplemental content server 204 in accordance with the same electronic supplemental content server interface specification. In at least one embodiment, the restricted preview version of the page 300 differs from the public version of the page 300 in that the restricted preview version of the page 300 provides additional information in the set of information provided to the electronic supplemental content server 204 in accordance with the same electronic supplemental content server interface specification. In at least one embodiment, the restricted preview version of the page 300 differs from the public version of the page 300 in that the restricted preview version of the page 300 provides an additional name-value pair in the set of information provided to the electronic supplemental content server 204 in accordance with the same electronic supplemental content server interface specification.

In at least one embodiment, the electronic page specification code of the electronic page 300 may be rendered visible by one or more of the electronic page viewing clients 206, 208, 210, 212, 214, 216, 218, 220 (FIG. 2) as described above. Furthermore, modifying the electronic page specification code may change the appearance of the rendering. In particular, modification of the electronic page specification code utilized to specify the advertising sections 308, 310, 312, 314, 316, 318, 320, 322, 324 may change advertising that is rendered in association with the advertising sections 308, 310, 312, 314, 316, 318, 320, 322, 324. The size and shape of the advertising sections 308, 310, 312, 314, 316, 318, 320, 322, 324 as depicted in FIG. 3 may correspond to a size and shape of corresponding rendered advertisements. However, each embodiment is not so limited. In particular, advertisements may change size and/or shape as part of interaction with a viewer of the electronic page 300 and/or each other. As part of rendering the electronic page 300 and, in particular, the advertising sections 308, 310, 312, 314, 316, 318, 320, 322, 324, electronic page viewing clients 206, 208, 210, 212, 214, 216, 218, 220 may request information, including supplemental content such as one or more advertisements and/or advertisement associated information, from the electronic supplemental content server 204.

Figure 4:
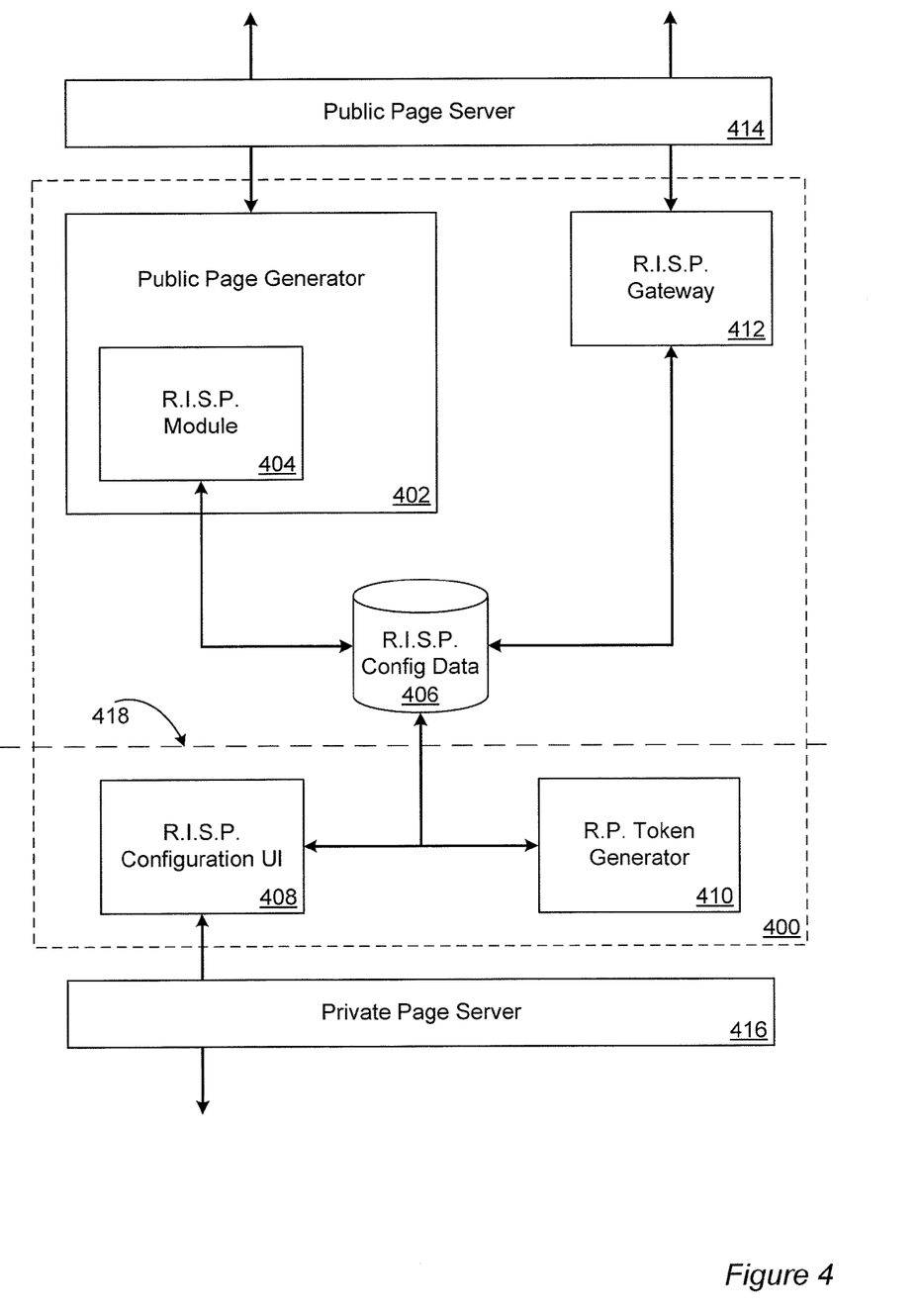
FIG. 4 is a schematic diagram depicting aspects of an example restricted in situ preview system in accordance with at least one embodiment.

To provide additional details with respect to identifying requests from electronic page viewing clients 214, 216, 218, 220 (FIG. 2) in restricted preview sets 226, 228, and consequent modification of delegated supplemental content sections, it will be helpful to reference an example restricted in situ preview system. Accordingly, FIG. 4 depicts an example restricted in situ preview system 400 in accordance with at least one embodiment. The restricted in situ preview system 400 may include a public page generator 402 capable of generating electronic pages such as the electronic page 300 of FIG. 3. The public page generator 402 may include a restricted in situ preview (R.I.S.P.) module 404.

The restricted in situ preview module 404 may utilize configuration data from a restricted in situ preview configuration data store 406. The configuration data in the restricted in situ preview configuration data store 406 may be created, read, updated and/or deleted by a restricted in situ preview configuration user interface (UI) 408. The restricted in situ preview configuration UI 408 may utilize a restricted preview token generator 410 to generate restricted preview tokens. A restricted in situ preview gateway 412 may be utilized to distributed restricted preview tokens. The restricted in situ preview module 404 may detect and/or validate restricted preview tokens and/or portions thereof. The restricted in situ preview module 404 may modify electronic pages generated by the public page generator 402 to include preview supplemental content.

In the example restricted in situ preview system 400, the public page generator 402 and the restricted in situ preview gateway 412 may receive requests, for example, from electronic page viewing clients 206, 208, 210, 212, 214, 216, 218, 220 in the public portion 224 of the network environment 200 of FIG. 2, through a public page server 414. In contrast, the restricted in situ preview configuration UI 408 may receive requests through a private page server 416. A dashed line 418 depicts the division of the restricted in situ preview system 400 into public and private portions (above and below the dashed line 418, respectively).

With reference to FIG. 1, the Web server 106 may incorporate and/or host the public page server 414. The application server 108 may incorporate and/or host the public page generator 402 and the restricted in situ preview gateway 412. The data store 110 may incorporate and/or host the restricted in situ preview configuration data store 406. The restricted in situ preview configuration UI 408 may be a Web-style user interface incorporated into and/or hosted by a private application server corresponding to the application server 108. The private page server 416 may be incorporated into and/or hosted by a private Web server corresponding to the Web server 106. The private Web server and the private application server may be accessible from a private network corresponding to the network 104. For example, the private network 104 may be disjoint from the public portion 224 of the network environment 200 of FIG. 2 and/or may be a virtual private network or require other heavyweight authentication and/or privacy techniques.

Figure 5:
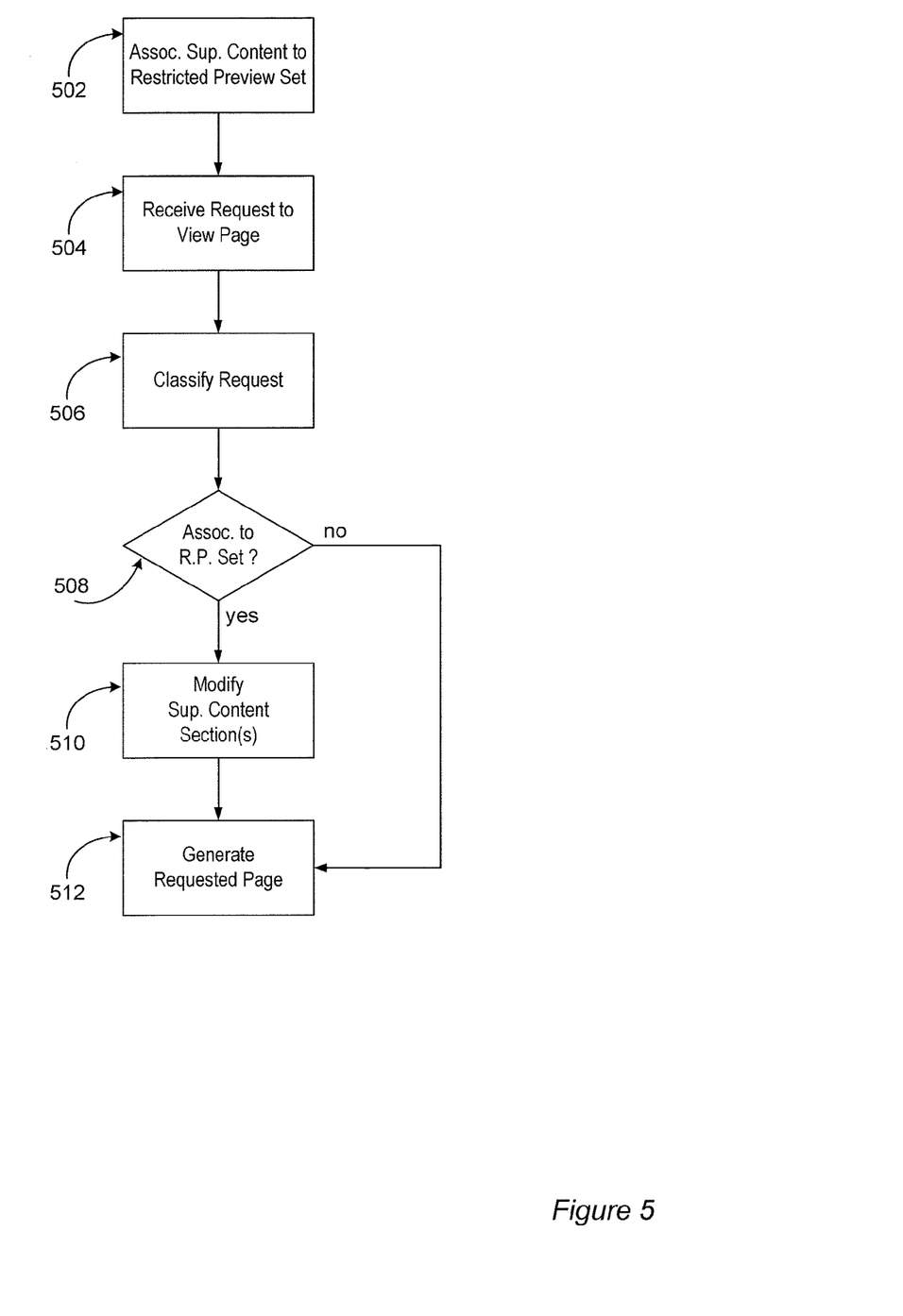
FIG. 5 is a flowchart depicting example steps for restricted in situ previews in accordance with at least one embodiment.

To describe details of interactions of between components of the restricted in situ preview system 400, it will be helpful to have reference to flowcharts depicting example steps in accordance with at least one embodiment. FIG. 5 depicts example for restricted in situ previews in accordance with at least one embodiment. At step 502, supplemental content may be associated with a restricted preview set such as one of the restricted preview sets 226, 228 of FIG. 2. For example, the supplemental content may be a preview advertisement. Alternatively, or in addition, the supplemental content may be an advertising preview campaign. The preview advertisement and/or the advertising preview campaign may be associated with an advertising preview identifier (e.g., a string of alphanumeric characters). Such an advertising preview identifier is an example of a supplemental content preview identifier. The supplemental content preview identifier may be incorporated into a restricted preview token. Hence the restricted preview token may be associated with any suitable supplemental content. For example, the restricted preview set may be the restricted preview set 226 of FIG. 2, and the supplemental content may be associated with the restricted preview set 226 by distributing copies of the restricted preview token incorporating the associated supplemental content preview identifier to each electronic page viewing client 214, 216 in the restricted preview set 226.

A supplemental content developer such as an advertising developer may develop a supplemental content program such as an advertising campaign, for example, including one or more interactive and/or interacting advertisements, with conventional supplemental content development tools such as advertising creative development tools. The supplemental content developer may determine a particular supplemental content preview identifier for the supplemental content program. For example, the supplemental content developer may assign an alphanumeric string to the supplemental content program. The supplemental content developer may "traffic" the supplemental content associated with the supplemental content program, that is, the supplemental content developer may upload the supplemental content program to the electronic supplemental content server 204 (FIG. 2), for example, with a conventional upload interface of the electronic supplemental content server 204. An aspect of uploading the supplemental content program to the electronic supplemental content server 204 may be registering the supplemental content program with the electronic supplemental content server 204. In particular, the supplemental content program may be associated with the supplemental content preview identifier in the electronic supplemental content server 204. For example, the supplemental content preview identifier may be associated with the supplemental content program in the electronic supplemental content server 204 as targeting information. The supplemental content preview identifier thus associated may be incorporated into a corresponding restricted preview token and distributed. Details of restricted preview token generation and distribution in accordance with at least one embodiment are described below with reference to FIG. 6.

At step 504, a request may be received to view a page. For example, one of the electronic page viewing clients 206, 208, 210, 212, 214, 216, 218, 220 in the public portion 224 of the network environment 200 depicted in FIG. 2 may request a current copy of the electronic page 300 (FIG. 3) from the electronic page server 202. A performance of step 504 may be at a distance in time from a performance of step 502. For example, restricted preview tokens may be generated and/or distributed in advance of the request to view the page at step 504. At step 506, the request may be classified. In particular, the request may be classified as a restricted preview request and/or as associated with one of the restricted preview sets 226, 228 of electronic page viewing clients 214, 216, 218, 220. For example, the electronic page server 202 may incorporate the public page generator 402 of FIG. 4, and the restricted in situ preview module 404 of the public page generator 402 may classify the request. Classification of the request may be based on one or more portions of a restricted preview token incorporated into the request, and is described in more detail below with reference to FIG. 6. In particular, classifying the request may include cryptographically validating the restricted preview token or portions thereof. If the request cannot be classified as a restricted preview request, the request may be classified as a public request.

At step 508, it may be determined whether the request is associated with one of the restricted preview sets 226, 228 (FIG. 2) of electronic page viewing clients 214, 216, 218, 220. For example, the association may be determined based at least in part on the classification made at step 506. If it is determined that the request is associated with one of the restricted preview sets 226, 228, a procedure incorporating step 508 may progress to step 510. Otherwise, the procedure may progress to step 512.

At step 510, one or more supplemental content sections such as the advertising sections 308, 310, 312, 314, 316, 318, 320, 322, 324 (FIG. 3) of the electronic page 300 may be modified. For example, the restricted in situ preview module 404 of FIG. 4 may modify the electronic page specification language utilized to specify advertising section 314. In at least one embodiment, each supplemental content section may be modified while remaining in accordance with an electronic supplemental content server interface specification, for example, an electronic supplemental content server interface specification for the electronic supplemental content server 204 of FIG. 2. In at least one embodiment, each supplemental content section may be modified to reference the advertisement and/or advertising campaign associated with the restricted preview set at step 502. For example, each advertising section may be modified to include any suitable electronic advertising associated with a restricted preview token. For example, the restricted in situ preview module 404 of FIG. 4 may modify the electronic page specification language utilized to specify advertising section 314 in accordance with the electronic supplemental content server interface specification to include a supplemental content preview identifier associated with the advertisement and/or advertising campaign that was associated with the restricted preview set at step 502. Such modification may include addition of a name-value pair, for example, a name-value pair corresponding to "preview=my_new_campaign." Hence, in at least one embodiment, a plurality of advertising sections may be modified to reference an advertising campaign, and such modification may enable an ability to co-ordinate a restricted in situ preview of electronic advertisements that interact and/or synchronize with each other and/or non-advertising content sections 302, 304, 306.

At step 512, the page requested at step 504 may be generated. For example, the public page generator 402 of FIG. 4 may generate the page. In at least one embodiment, steps 508 and 510 may be incorporated into step 512. For example, each section 302, 304, 306, 308, 310, 312, 314, 316, 318, 320, 322, 324 of the electronic page 300 of FIG. 3 may be generated as part of an integrated process, and decisions to modify advertising sections 308, 310, 312, 314, 316, 318, 320, 322, 324 may be incorporated into that process. In at least one embodiment, restricted in situ preview functionality may be centrally enabled and disabled. For example, an additional step, not shown in FIG. 5, may test whether restricted in situ preview functionality as a whole is disabled and, if so, skip the modifying step 510.

As described above, restricted preview tokens may be utilized to maintain restricted preview sets of clients such as the restricted preview sets 226, 228 of FIG. 2. A restricted preview token in accordance with at least one embodiment may reference an advertisement and/or advertising campaign. For example, the restricted preview token may incorporate an associated advertising preview identifier. The restricted preview token may reference an expiration date. For example, the restricted preview token may incorporate a timestamp corresponding to the expiration date.

The restricted preview token may be applicable to a collection of electronic pages such as a Web site. Alternatively, or in addition, the restricted preview token may reference a particular electronic page such as the electronic page 300 of FIG. 3. In at least one embodiment, the restricted preview token may incorporate a restricted preview locator. The restricted preview locator may reference the particular electronic page, e.g., specify a location of the particular electronic page. For example, the particular electronic page may be a Web page, and the restricted preview locator may incorporate a uniform resource locator (URL) referencing the Web page. Alternatively, or in addition, the restricted preview locator may reference a collection of electronic pages, for example, as specified by a regular expression of a pattern matching language. As will be apparent to one of skill in the art, such a regular expression may, for example, specify a subset of Web page uniform resource locators associated with a particular Web site.

One or more portions, including all, of the restricted preview token may be encrypted, for example, cryptographically encrypted for purposes of information privacy, information verification and/or information source confidence. Such encryption is well known in the art and need not be detailed here. Any suitable encryption technique may be employed. Encryption of the one or more portions of the restricted preview token may make the restricted preview token resistant to tampering, for example, by viewers of the electronic page 300 of FIG. 3. For example, the encrypted portion(s) the restricted preview token may contain information such as a cryptographic checksum that may be utilized to verify that unencrypted portions of the restricted preview token have not been changed since the restricted preview token was generated.

Figure 6:
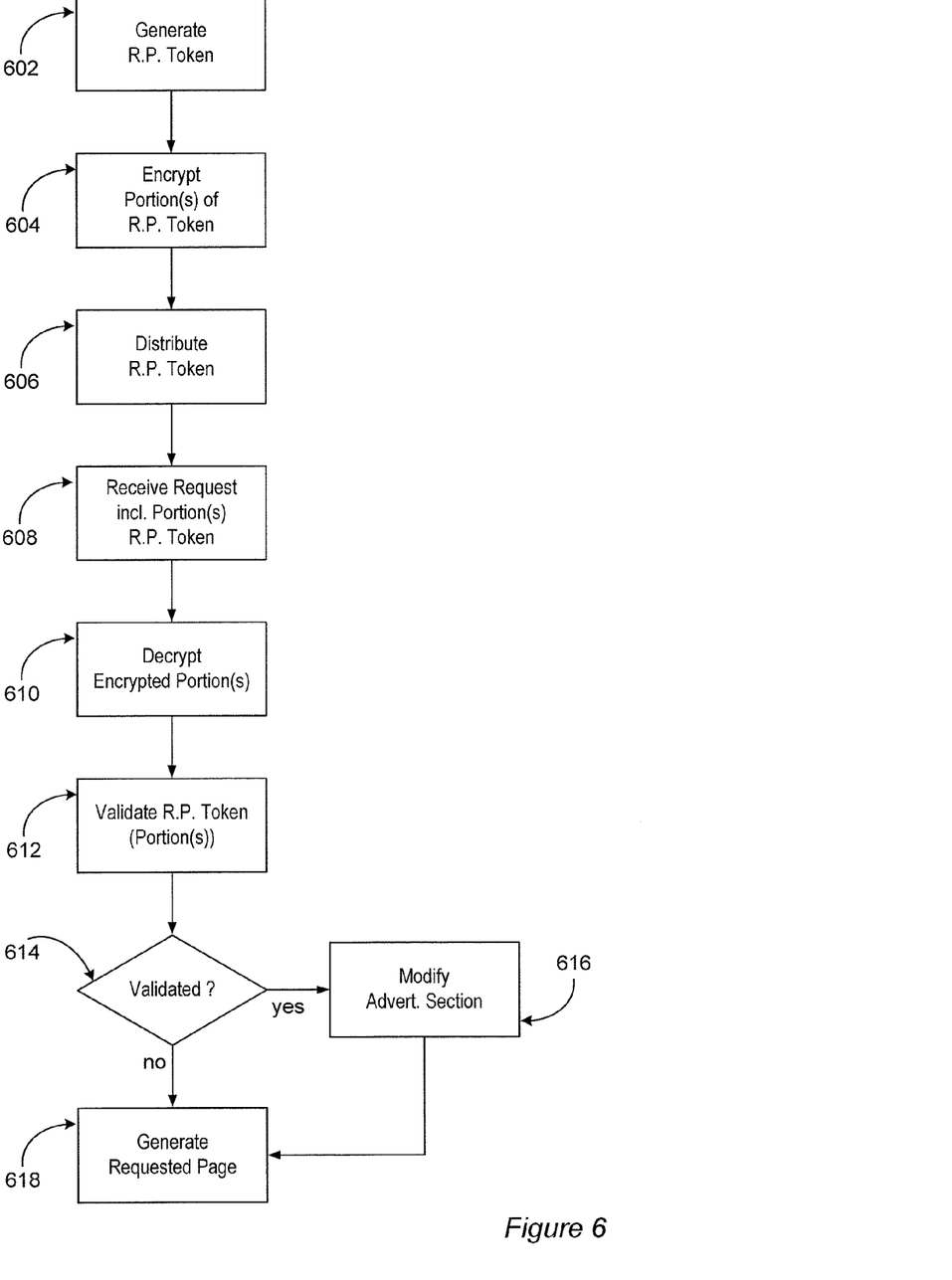
FIG. 6 is a flowchart depicting example steps for utilizing restricted preview tokens in accordance with at least one embodiment.

To describe details of how restricted preview tokens may be utilized, for example, in a context of the network environment 200 of FIG. 2, it will be helpful to have reference to a flowchart depicting example steps in accordance with at least one embodiment. FIG. 6 depicts example steps for utilizing restricted preview tokens in accordance with at least one embodiment. At step 602, a restricted preview token may be generated. For example, the restricted preview token may be generated by the restricted preview token generator 410 of FIG. 4. At step 604, one or more portions of the restricted preview token may be encrypted, for example, by the restricted preview token generator 410. In at least one embodiment, steps 602 and 604 may be integral. For example, encryption of the restricted preview token may be integral to generation of the restricted preview token.

At step 606, the restricted preview token may be distributed. For example, copies of the restricted preview token generated at step 602 may be distributed by any suitable distribution facility. The restricted preview token may be provided to one or more users, for example, users of the electronic page server 202 of FIG. 2. Providing the restricted preview token to one or more users is an example of distributing the restricted preview token. In at least one embodiment, the restricted preview token may be attached to and/or embedded in an electronic mail message ("e-mail"). In at least one embodiment, the restricted preview token may be incorporated into a uniform resource locator (URL), and distributed with conventional URL distribution facilities.

Alternatively, or in addition, distribution of restricted preview tokens may incorporate a restricted in situ preview gateway such as the restricted in situ preview gateway 412 of FIG. 4. For example, the restricted preview token generator 410 may generate a reference such as a URL to the restricted in situ preview gateway 412, and the reference to the restricted in situ preview gateway 412 may be distributed with conventional reference distribution facilities including conventional URL distribution facilities such as e-mail. Recipients of the reference to the restricted in situ preview gateway 412 may utilize the reference to request a copy of an associated restricted preview token from the restricted in situ preview gateway 412, for example, the restricted preview token generated at step 602. In at least one embodiment, the restricted preview token may be incorporated into a hypertext transfer protocol (HTTP) message, for example, into a hypertext transfer protocol (HTTP) cookie, and distributed with conventional HTTP facilities and/or HTTP cookie distribution facilities. In at least one embodiment, steps 602, 604 and 606 may be integral. For example, the restricted preview token may be generated and/or encrypted by the restricted in situ preview gateway 412.

The restricted in situ preview configuration data store 406 of FIG. 4 may store restricted preview tokens and/or associated data. However, in at least one embodiment, the restricted in situ preview configuration data store 406 does not store restricted preview tokens, and any associated data stored by the restricted in situ preview configuration data store 406 is minimal. For example, the restricted in situ preview configuration data store 406 may store little more than information required to validate restricted preview tokens. In at least one embodiment, restricted preview tokens and/or references to the restricted in situ preview gateway 412 distributed at step 606 act as a distributed data store for restricted in situ preview configuration data. Steps 602, 604 and 606 are examples of steps that may be performed as part of the associating step 502 of FIG. 5.

At step 608, a request may be received. For example, a request for the electronic page 300 of FIG. 3 may be received from one of the electronic page viewing clients 206, 208, 210, 212, 214, 216, 218, 220 of FIG. 2. The request may include one or more portions, including all, of the restricted preview token. For example, the request may include a hypertext transfer protocol (HTTP) message, and the portion(s) of the restricted preview token may be incorporated into the hypertext transfer protocol message. In at least one embodiment, the portion(s) of the restricted preview token may be incorporated into a uniform resource locator (URL) associated with the hypertext transfer protocol message, for example, the restricted preview token may be incorporated into a query string portion of the uniform resource locator. In at least one embodiment, the portion(s) of the restricted preview token may be incorporated into an HTTP cookie associated with the hypertext transfer protocol message. Step 608 is an example of a step that may be performed as part of the receiving step 504 of FIG. 5.

Some, including all, of the portion(s) of the restricted preview token received at step 608 may be encrypted. At step 610, encrypted portion(s) of the restricted preview token may be decrypted. At step 612, the portion(s) of the restricted preview token and/or the associated restricted preview token may be validated. For example, decrypted portion(s) of the restricted preview token may be utilized to detect tampering, as described above. In at least one embodiment, validation fails if the decryption of step 610 fails. As another example, decryption may fail if an encryption key has been changed. A particular encryption key may be changed, for example, explicitly to invalidate an associated set of restricted preview tokens. Such an encryption key change may be manual or automatic, for example, as determined by a set of token invalidation policies and/or supplemental content access policies such as electronic advertisement access policies. Token invalidation policies may include policies based at least in part on associated advertising campaign attributes and/or associated electronic page attributes such as traffic statistics including supplemental content access. For example, monitoring of such electronic page attributes may be performed by the public page generator 402 (FIG. 4). In at least one embodiment, validation fails if the restricted preview token has expired, that is, if the current date and time is later than an associated expiration date. In at least one embodiment, validation fails if an supplemental content preview identifier referenced by the restricted preview token or portion(s) thereof is not contained in an active supplemental content preview identifier set, for example, stored in the restricted in situ preview configuration data store 406, and maintained with the restricted in situ preview configuration UI 408. Steps 610 and 612 are examples of steps that may be performed as part of the classifying step 506 of FIG. 5.

At step 614, it may be determined whether the restricted preview token or portion(s) thereof were validated at step 612. If validation did occur, a procedure incorporating step 614 may progress to step 616. Otherwise, the procedure may progress to step 618. Step 614 is an example of a step that may be performed as part of the determining step 508 of FIG. 5. At step 616, one or more advertising sections such as the advertising sections 308, 310, 312, 314, 316, 318, 320, 322, 324 (FIG. 3) of the electronic page 300 may be modified, for example, as described above with reference to step 510 of FIG. 5. At step 618, a page associated with the request of step 608 may be generated, for example, as described above with reference to step 512. As with steps 508, 510 and 512, in at least one embodiment, steps 614, 616 and 618 may be incorporated into an integrated electronic page generation process.

Figure 7:
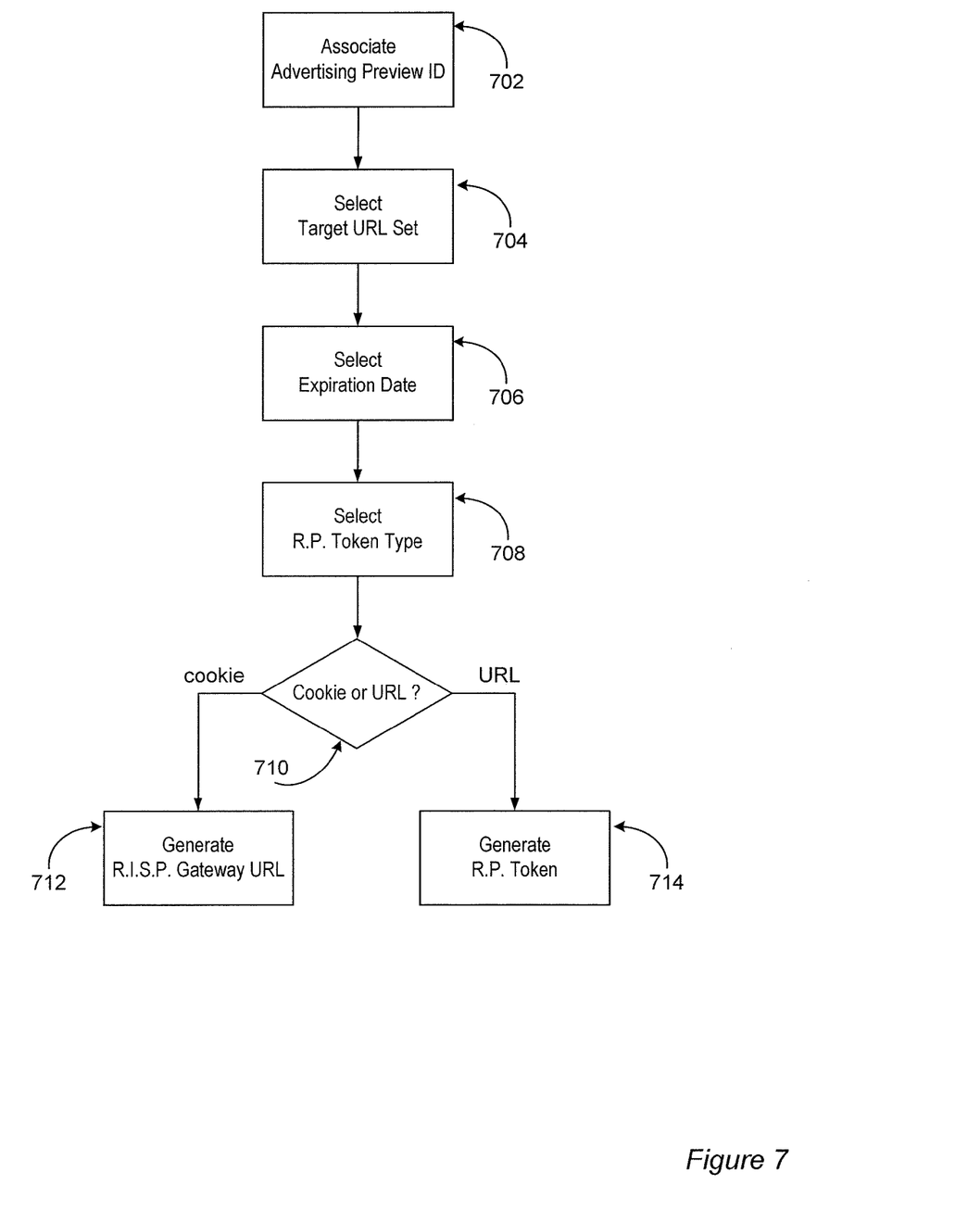
FIG. 7 is a flowchart depicting example steps for generating restricted preview tokens in accordance with at least one embodiment.

In at least one embodiment, there may be a plurality of types of restricted preview token. FIG. 7 depicts example steps for generating restricted preview tokens in accordance with at least one embodiment and, in particular, different types of restricted preview token in accordance with at least one embodiment. For example, restricted preview token types may include an HTTP cookie type and a uniform resource locator (URL) type. The HTTP cookie type of restricted preview token may be incorporated in an HTTP cookie as described above, and may be applicable to a collection of electronic pages such as a Web site, and for a specified period of time, for example, as determined by an expiration date. The uniform resource locator type of restricted preview token may be incorporated in a uniform resource locator as described above, and may be applicable to an electronic page such as the electronic page 300 of FIG. 3 referenced by the uniform resource locator. Alternatively, or in addition, each type of restricted preview token may be applicable to a collection of electronic pages, for example, as specified by a regular expression of a pattern matching language. The uniform resource locator type of restricted preview token may also incorporate an expiration date. In at least one embodiment, the uniform resource locator type of restricted preview token may be implemented independent of an HTTP cookie. Such independence may provide a benefit, for example, the uniform resource locator type of restricted preview token may be utilizable by ones of the electronic page viewing clients 206, 208, 210, 212, 214, 216, 218, 220 (FIG. 2) without an HTTP cookie facility and/or that are configured to reject HTTP cookies. As another example, such independence may enable independence of the restricted in situ preview gateway 412 (FIG. 4) during restricted preview token distribution. A contribution of such independence to simplified restricted preview token distribution may be significant.

At step 702, an advertising preview identifier may be associated with the restricted preview token, for example, the advertising preview identifier may be entered into an alphanumeric text field of the restricted in situ preview configuration UI 408. At step 704, a target uniform resource locator (URL) set may be selected. The target URL set may include one or more URLs referencing electronic pages such as the electronic page 300 of FIG. 3. For example, a particular URL or a regular expression matching a set of URLs may be entered into a text field of the restricted in situ preview configuration UI 408. At step 706, an expiration date may be selected for the restricted preview token, for example, utilizing an expiration date selection component of the restricted in situ preview configuration UI 408.

At step 708, a restricted preview token type may be selected for a restricted preview token to be generated, for example, utilizing a restricted preview token type selection component of the restricted in situ preview configuration UI 408. At step 710, it may be determined which restricted preview token type was selected at step 708. If the HTTP cookie type of restricted preview token was selected, a procedure incorporating step 710 may progress to step 712. If the uniform resource locator type of restricted preview token was selected, the procedure may progress to step 714.

At step 712, a restricted in situ preview gateway URL for the restricted preview token may be generated. For example, the restricted in situ preview gateway URL may reference the restricted in situ preview gateway 412 of FIG. 4. The restricted in situ preview gateway URL may incorporate the advertising preview identifier from step 702, the target URL set, or a specification thereof, from step 704 and/or the expiration date from step 706.

Figure 8:
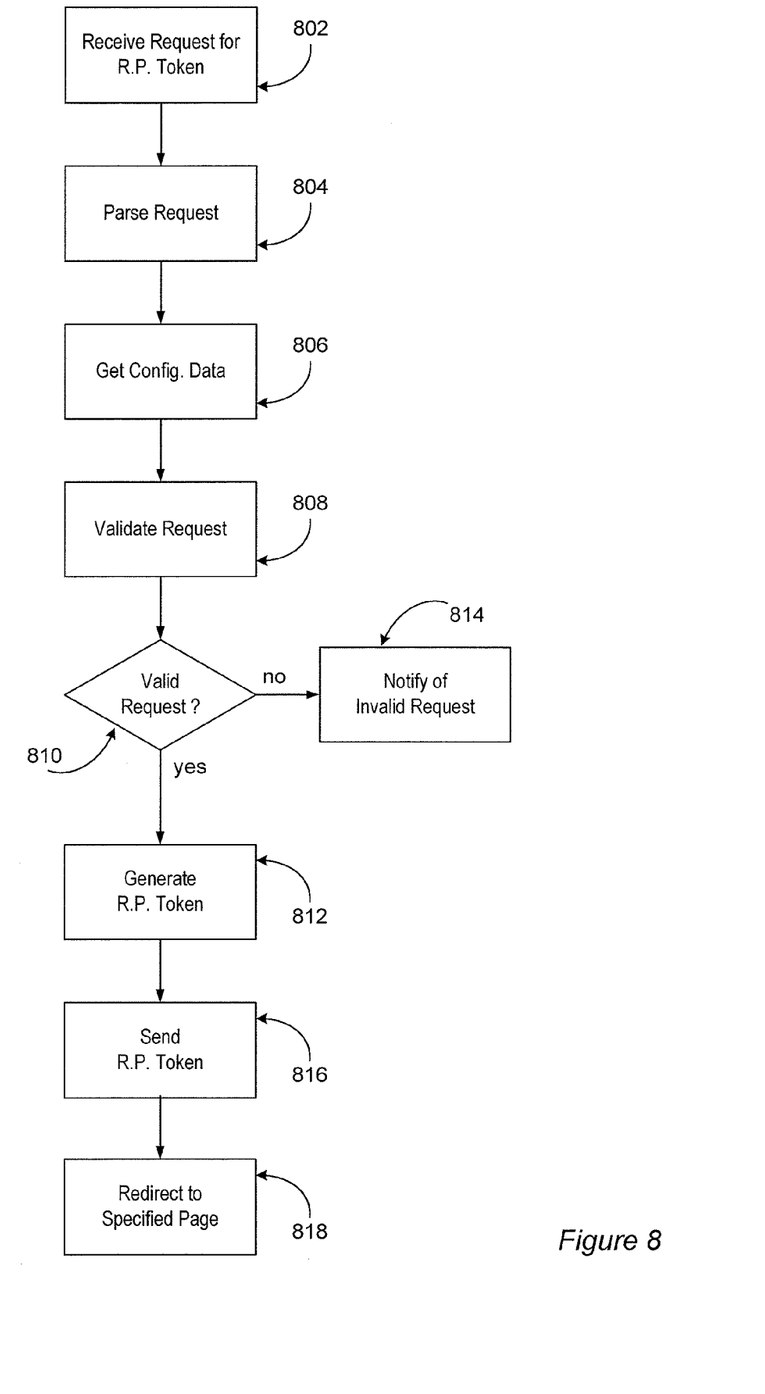
FIG. 8 is a flowchart depicting example steps performed by a restricted in situ preview gateway in accordance with at least one embodiment.

In at least one embodiment, further steps such as those described below with reference to FIG. 8 are required to progress generation of restricted preview tokens of the HTTP cookie type. However, before turning to FIG. 8, the description returns to example steps for generating restricted preview tokens of the uniform resource locator type. At step 714, the restricted preview token of the uniform resource locator type may be generated. For example, the restricted in situ preview configuration UI 408 may instruct the restricted preview token generator 410 to generate the restricted preview token.

As described above, restricted preview tokens of the HTTP cookie type may be distributed indirectly. For example, the restricted in situ preview gateway URL generated at step 712 may be distributed to electronic page viewing clients 214, 216, 218, 220 in the public portion 224 of the network environment 200 of FIG. 2, and the electronic page viewing clients 214, 216, 218, 220 may utilize the restricted in situ preview gateway URL to obtain a copy of the associated restricted preview token from the restricted in situ preview gateway 412 (FIG. 4). FIG. 8 depicts example steps that may be performed by the restricted in situ preview gateway 412 in accordance with at least one embodiment. In particular, the steps of FIG. 8 may be performed by the restricted in situ preview gateway 412 in response to receiving a request associated with the restricted in situ preview gateway URL.

At step 802, a request for a restricted preview token may be received. For example, electronic page viewing clients 214, 216, 218, 220 in the public portion 224 of the network environment 200 of FIG. 2 may utilize the restricted in situ preview gateway URL to locate the restricted in situ preview gateway 412 (FIG. 4) and request the restricted preview token. At step 804, the request may be parsed. For example, the restricted in situ preview gateway 412 may parse the request for information required to generate the restricted preview token. In at least one embodiment, such information includes the advertising preview identifier associated at step 702 of FIG. 7. In at least one embodiment, such information further includes the target URL set selected at step 704, or a specification thereof. In at least one embodiment, such information still further includes the expiration date selected at step 706. In at least one embodiment, one or more portions of the request may be encrypted, and the parsing includes decrypting.

At step 806, restricted in situ preview configuration data may be obtained. For example, the restricted in situ preview gateway 412 (FIG. 4) may obtain restricted in situ preview configuration data required to validate the request of step 802 and/or to generate the restricted preview token from the restricted in situ preview configuration data store 406. At step 808, the request may be validated. For example, the restricted in situ preview gateway 412 may verify that the request has a proper form and/or includes any restricted in situ preview configuration data required to generate the restricted preview token. Alternatively, or in addition, step 808 may include cryptographic validation of the request, for example, verification of a cryptographic checksum and/or signature.

At step 810, it may be determined whether the request is valid, for example, utilizing a result of step 808. If the request is valid, a procedure incorporating step 810 may progress to step 812. Otherwise, the procedure may progress to step 814. At step 812, the restricted preview token may be generated. For example, the restricted in situ preview gateway 412 (FIG. 4) may generate the restricted preview token from the restricted in situ preview configuration data obtained at steps 804 and/or 806. Alternatively, or in addition, the restricted in situ preview gateway 412 may utilize the restricted preview token generator 410 to generate the restricted preview token as described above. If the request fails validation at step 808, a notification of invalid request may be generated at step 814 and, for example, sent to the electronic page viewing client that generated the request received at step 802.

At step 816, the restricted preview token may be sent. For example, the restricted preview token generated at step 812 may be sent to a particular electronic page viewing client 214, 216, 218, 220 (FIG. 2) that requested the restricted preview token at step 802 ("the requestor"). If the restricted preview token is of the HTTP cookie type, then at step 816, the restricted preview token may be incorporated into an HTTP cookie and sent to an HTTP client as part of an HTTP message. At step 818, the requestor may be redirected to a specified electronic page. For example, the requestor may be redirected to an electronic page associated with the restricted preview token. Where the requestor utilizes and/or incorporates a client capable of parsing HTML, the redirection at step 818 may be implemented with an HTML "meta" tag, for example, that specifies a client "refresh" to load the specified electronic page.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of previewing electronic advertising in a production environment, comprising:

under control of one or more computer systems configured with executable instructions, providing a restricted preview token associated with electronic advertising to at least one user of a public portion of a network environment, wherein viewing of the electronic advertising is restricted to the at least one user provided with the restricted preview token, the restricted preview token comprises a preview identifier indicating that the at least one user is permitted to view the electronic advertising, and at least a portion of the restricted preview token is encrypted;

receiving a request including the restricted preview token, the request referencing an electronic page that comprises an electronic advertising section;

decrypting the encrypted portion of the restricted preview token; and if the restricted preview token is valid, modifying the electronic advertising section to include the electronic advertising associated with the restricted preview token in accordance with an electronic advertisement server interface specification, the electronic advertising including a restricted preview version that differs from a public version.

2. A computer-implemented method according to claim 1, wherein the restricted preview token comprises a hypertext transfer protocol cookie.

3. A computer-implemented method according to claim 1, wherein:

the advertising section comprises electronic page specification code in accordance with the electronic advertisement server interface specification; and modifying the advertising section comprises modifying the electronic page specification code in accordance with the electronic advertisement server interface specification.

4. A computer-implemented method according to claim 3, wherein:

the electronic page specification code comprises at least one parameter; and modifying the electronic page specification code comprises modifying said at least one parameter in accordance with the electronic advertisement server interface specification.

5. A computer-implemented method according to claim 1, wherein the restricted preview token is valid at least if the restricted preview token has not expired.

6. A computer-implemented method according to claim 1, wherein the restricted preview token is valid at least if the restricted preview token references the electronic page.

7. A computer-implemented method of previewing electronic advertising in a production environment, comprising:

under control of one or more computer systems configured with executable instructions, providing a restricted preview locator associated with electronic advertising to at least one user of a public portion of a network environment, wherein viewing of the electronic advertising is restricted to the at least one user provided with the restricted preview locator, the restricted preview locator comprises a preview identifier indicating that the at least one user is permitted to view the electronic advertising, and wherein at least a portion of the restricted preview locator is encrypted, and the restricted preview locator references an electronic page that comprises an advertising section;

receiving a request for the electronic page, the request including the preview identifier and the encrypted portion of the restricted preview locator;

validating the request based at least in part on the encrypted portion of the restricted preview locator; and if the request is valid, modifying the advertising section to include the electronic advertising associated with the restricted preview locator in accordance with an electronic advertisement server interface specification, the electronic advertising including a restricted preview version that differs from a public version.

8. A computer-implemented method according to claim 7, wherein the restricted preview locator comprises a uniform resource locator.

9. A computer-implemented method according to claim 7, wherein the encrypted portion of the restricted preview locator references the electronic advertising.

10. A computer-implemented method according to claim 7, wherein validating the request comprises verifying that the electronic page is a member of an electronic page collection referenced by the encrypted portion of the restricted preview locator.

11. A computer-implemented method of previewing electronic advertising in a production environment, comprising:

under the control of one or more computer systems configured with executable instructions, associating an electronic advertisement to a restricted preview set of clients in a public portion of a network environment such that viewing of the electronic advertisement is restricted to the restricted preview set of clients, wherein the restricted preview set of clients is associated with a preview identifier indicating that the restricted preview set of clients is permitted to view the electronic advertisement;

receiving a request for an electronic page comprising an advertising section, the request including the preview identifier;

classifying the request as associated with the restricted preview set of clients based at least in part on a cryptographic verification of the association; and modifying the advertising section to include the electronic advertisement in accordance with an electronic advertisement server interface specification, the electronic advertisement including a restricted preview version that differs from a public version.

12. A computer-implemented method according to claim 11, wherein associating the electronic advertisement to the restricted preview set of clients comprises generating a restricted preview token for the electronic advertisement.

13. A computer-implemented method according to claim 11, wherein associating the electronic advertisement to the restricted preview set of clients comprises distributing a restricted preview token for the electronic advertisement.

14. A computer-implemented method according to claim 13, wherein the restricted preview token comprises a restricted preview locator.

15. A computer-implemented method according to claim 11, wherein the request comprises at least one portion of a restricted preview token.

16. A computer-implemented method according to claim 11, wherein the request comprises at least one encrypted portion of a restricted preview token.

17. A computer-implemented method according to claim 11, wherein classifying the request comprises validating at least one portion of a restricted preview token.

18. A computer-implemented method according to claim 17, wherein validating at least one portion of the restricted preview token comprises decrypting at least one encrypted portion of the restricted preview token.

19. A computer-implemented method according to claim 11, wherein the request comprises a restricted preview reference to the electronic advertisement.

20. A computer-implemented method according to claim 11, wherein the advertising section is managed by an advertising service.

21. A computer-implemented method according to claim 11, wherein the advertising section is configured in accordance with an electronic advertisement server interface specification.

22. A computer-implemented method according to claim 21, wherein modifying the advertising section comprises modifying the advertising section in accordance with the electronic advertisement server interface specification.

23. A computer-implemented method according to claim 11, wherein:
the electronic page comprises a plurality of advertising sections; and
the method further comprises modifying each of the plurality of advertising sections to include reference to the electronic advertisement.

24. A computer-implemented method according to claim 11, wherein:
the method further comprises:
monitoring access of the electronic advertisement;
detecting a violation of an electronic advertisement access policy; and
changing an encryption key; and
the cryptographic verification fails if the encryption key has been changed.

25. A computerized system for previewing electronic advertising in a production environment comprising:
a computer processor; and
a restricted in situ preview module comprising instructions that, when executed by the processor, cause the processor to:
associate a first electronic advertisement to a first restricted preview set of a public portion of a network environment, wherein viewing of the first electronic advertisement is restricted to the first restricted preview set, and the first restricted preview set is associated with a first preview identifier indicating that the first restricted preview set is permitted to view the electronic advertisement;
receive a first request for an electronic page comprising an advertising section, the first request including the first preview identifier;
classify the first request as associated with the first restricted preview set based at least in part on a cryptographic verification of the association; and
modify the advertising section to include the first electronic advertisement in accordance with an electronic advertisement server interface specification, the electronic advertisement including a restricted preview version that differs from a public version.

26. A system according to claim 25, wherein modifying the advertising section comprises modifying the advertising section based at least in part on a classification of the first request.

27. A system according to claim 25, wherein the first restricted preview set is one of a plurality of restricted preview sets.

28. A system according to claim 25, wherein the restricted preview version is a first restricted preview version and wherein the restricted in situ preview module further comprises instructions that, when executed by the processor, cause the processor to:
associate a second electronic advertisement with a second restricted preview set of the public portion of the network environment, wherein viewing of the second electronic advertisement is restricted to the second restricted preview set, and the second restricted preview set is associated with a second preview identifier indicating that the second restricted preview set is permitted to view the second electronic advertisement;
receive a second request for the electronic page, the second request comprising the second preview identifier;
classify the second request as associated with the second restricted preview set; and
modify the advertising section to include the second electronic advertisement in accordance with the electronic advertisement server interface specification, the second electronic advertisement being a second restricted preview version different from the restricted preview version and the public version.

29. One or more non-transitory computer-readable media having collectively thereon computer-executable instructions that configure one or more computers to collectively, at least:
associate an electronic advertisement to a restricted preview set of a public portion of a network environment, wherein viewing of the electronic advertisement is restricted to the restricted preview set, and the restricted preview set is associated with a preview identifier indicating that the restricted preview set is permitted to view the electronic advertisement;
receive a request for an electronic page comprising an advertising section, the request including the preview identifier;
classify the request as a restricted preview request;
cryptographically verify an association between the restricted preview request and the restricted preview set; and
modify the advertising section to include the electronic advertisement in accordance with an electronic advertisement server interface specification, wherein the electronic advertisement includes a restricted preview version that differs from a public version.

30. One or more non-transitory computer-readable media according to claim 29, wherein classifying the request as the restricted preview request comprises:
attempting to classify the request as the restricted preview request; and
if the attempt fails, treating the request as a public request.

* * * * *